US012812415B2

(12) United States Patent
Rajendran

(10) Patent No.: US 12,812,415 B2
(45) Date of Patent: Nov. 24, 2026

(54) ON HANDSET NETWORK ISSUE DETECTION AND REMEDIATION TOOL

(71) Applicant: Boost SubscriberCo L.L.C., Englewood, CO (US)

(72) Inventor: Karupaiah Rajendran, Plano, TX (US)

(73) Assignee: BOOST SUBSCRIBERCO L.L.C., Englewood, CO (US)

( * ) Notice: Subject to any disclaimer, the term of this patent is extended or adjusted under 35 U.S.C. 154(b) by 258 days.

(21) Appl. No.: 18/440,571

(22) Filed: Feb. 13, 2024

(65) Prior Publication Data

US 2025/0261005 A1 Aug. 14, 2025

(51) Int. Cl.
*H04L 41/0654* (2022.01)
*H04L 43/0823* (2022.01)
*H04W 24/04* (2009.01)

(52) U.S. Cl.
CPC ......... *H04W 24/04* (2013.01); *H04L 41/0654* (2013.01); *H04L 43/0823* (2013.01)

(58) Field of Classification Search
CPC ..... H04W 24/04; H04W 24/02; H04W 24/08; H04L 41/0654; H04L 43/0823; H04L 41/16; H04L 43/0811
See application file for complete search history.

(56) References Cited

U.S. PATENT DOCUMENTS

2023/0370338 A1* 11/2023 Shori .................. H04L 41/0661
2025/0150803 A1* 5/2025 An .......................... H04W 8/06

FOREIGN PATENT DOCUMENTS

CN 107197421 A * 9/2017 ............ H04W 12/06

* cited by examiner

*Primary Examiner* — Said M Elnoubi

(74) *Attorney, Agent, or Firm* — Seed Intellectual Property Law Group LLP

(57) ABSTRACT

A network issue detection and remediation system is described herein. The system receives monitored network connection metrics for a user device and identifies a network issue associated with a network to which the user device was connected and a time at which the network issue occurred based on the network connection metrics. The system identifies a cell site to which the user device was connected during the time at which the identified network issue occurred. The system causes the identified network issue to be remedied based on the cell site, identified network issue, and the time at which the identified network issue occurred.

20 Claims, 6 Drawing Sheets

ON HANDSET NETWORK ISSUE DETECTION AND REMEDIATION TOOL

BACKGROUND

Network providers, such as telecommunication network providers, identify network issues that affect network connections of user devices based on user reports. Such issues may be related to connections to a "roaming network," which is a network associated with a first network provider that provides networking services to user devices associated with a second network provider. It is with respect to this and other considerations that the embodiments described herein have been made.

BRIEF SUMMARY

The embodiments disclosed herein improve technology that identifies network issues in a telecommunications network by providing a technical solution that collects data indicating network connection metrics from user devices and identifies network issues based on the collected data. The embodiments disclosed herein may cause the identified network issue to be remedied based on the collected data. The embodiments disclosed herein may cause the collected data to be transmitted contemporaneously with the collection of the data.

In some embodiments, a handset network issue detection system may train a machine learning model to predict whether a network issue regarding a network connection of a user device is likely to occur based on training data that includes the collected data. The handset network issue detection system may predict whether a network issue regarding a network connection of a user device is likely to occur by applying collected data to the machine learning model. The handset network issue detection system may generate a remedy based on the predicted network issue. The handset network issue detection system may apply the remedy based on an indication that a network issue experienced by a user device is a network issue of a similar type to the predicted network issue.

In some embodiments, a handset network issue detection system identifies a status of a user device. The handset network issue detection system may determine, based on the identified status, whether contemporaneous transmission of collected network connection metric data is detrimental to operation of the user device. The handset network issue detection system may pause the contemporaneous transmission of collected data based on the determination of whether contemporaneous transmission of collected network connection metric data is detrimental to operation of the user device.

In some embodiments, a handset network issue detection system receives data indicating one or more network issues affecting user devices other than a selected user device. The handset network issue detection system may determine whether an identified network issue is related to one or more attributes of the selected user device based on the data indicating on or more network issues affecting other user devices. The handset network issue detection system may cause at least one attribute of the selected user device to change based on the determination of whether the identified network issue is related to one or more attributes of the user device.

In some embodiments, to cause the network issue to be remedied, a handset network issue detection system may transmit data indicating a cell site, an identified network issue, and a time at which the network issue occurred to a system configured to remedy network issues. The system configured to remedy network issues may be a system associated with a roaming network provider.

In some embodiments, to cause the network issue to be remedied, the handset network issue detection system may determine a cause of the network issue based on data indicating the cell site, the identified network issue, and the time at which the network issue occurred. The handset network issue detection system may determine the cause based on one or more attributes of a user device associated with the network issue. The cause of the network issue may be associated with: a cell site, a state of a user device, a location of a user device, one or more network connection metrics associated with a user device, or some combination thereof.

In some embodiments, the handset network issue detection system detects whether a user device is connected to a roaming network or a home network.

In some embodiments, the identified network issue is a network issue associated with: a dropped call, a dropped data packet, an indication that a network connection metric exceeds a threshold range, an indication of a network connection metric measured when a user device is connected to a roaming network, or some combination thereof.

In some embodiments, a handset network issue detection system receives one or more network connection metrics from a plurality of user devices. The handset network issue detection system may identify a network issue, a time at which the network issue occurred, and a cell site based on the network connection metrics. The handset network issue detection system may cause the identified network issue to be remedied based on the cell site, the identified network issue, and the time at which the network issue occurred.

In some embodiments, one or more aspects of the handset network identification system are preformed, included in, etc., a user device, a Self-Organizing Network ("SON"), a Radio Access Network Intelligent Controller ("RIC"), or some combination thereof.

DETAILED DESCRIPTION

Figure 1:
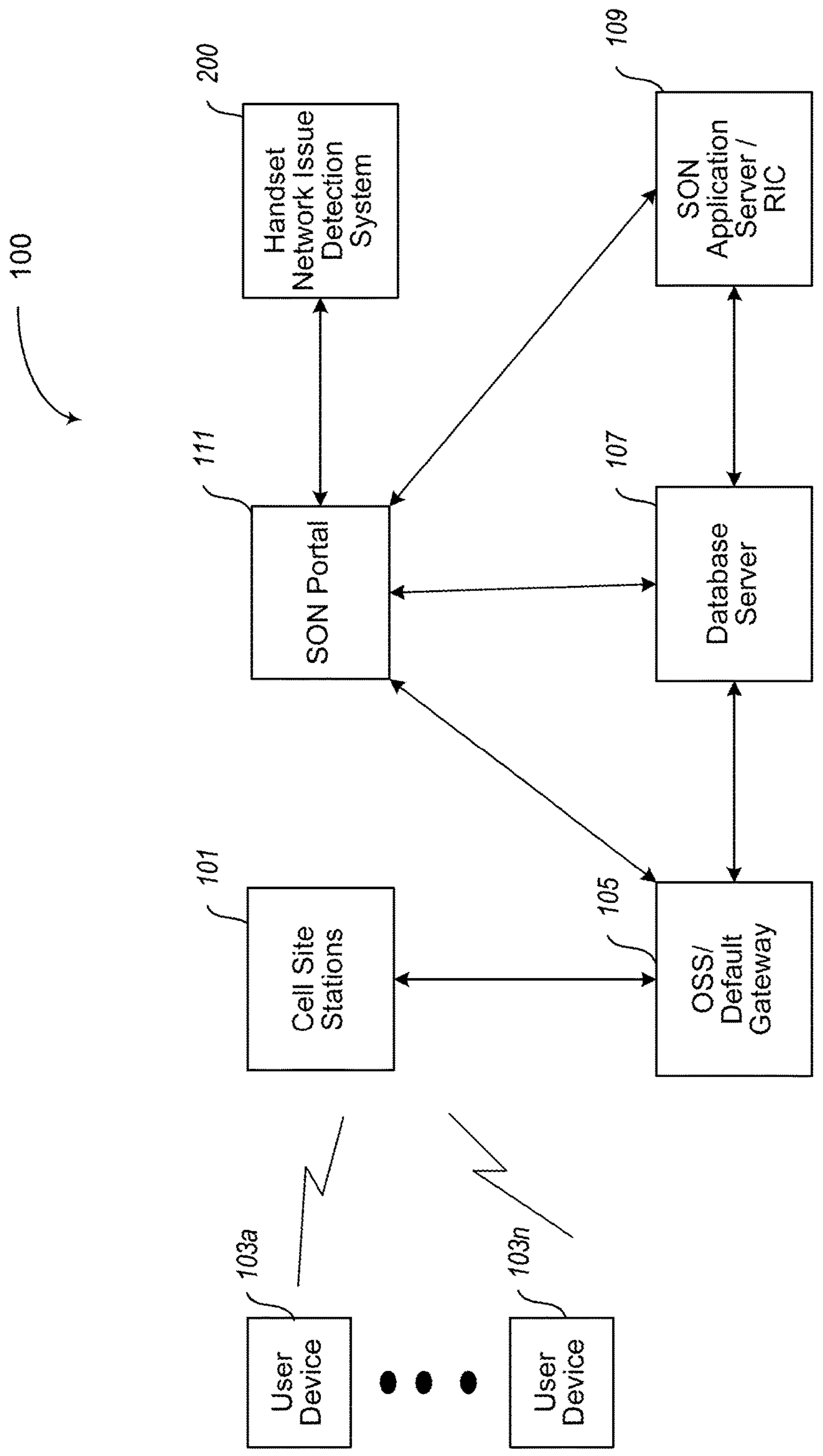
FIG. 1 is a display diagram depicting a sample environment in which a handset network identification system operates, according to various embodiments described herein.

Network providers, such as telecommunication network providers, identify network issues based on user reports of such network issues. Conventional systems to identify such issues depend on user reports of issues after the issue occurs and attempt to diagnose the network issue and its cause based on data collected by network systems. Furthermore, the user device may have been connected to a roaming network instead of a "home network" at the time the network issue occurs. A home network is a network associated with a network provider that provides networking services to devices associated with a user (a "home network provider"). A roaming network is a network associated with a network provider that has contracted with the home network provider to provide networking services to users of the home network in geographic areas where the home network is not able to be used by devices associated with the user.

However, conventional systems to identify such issues are typically unable to access data regarding network connection metrics regarding a network connection of a user device at the time that the network issue occurred, because the network issue is not known until the user reports the issue. Furthermore, in cases where the user device is connected to a roaming network, the home network provider must dispatch a team of technicians to a geographic area in which a network issue occurred in order to obtain data needed to resolve the network issue, such as data indicating a roaming network or other network caused interference in the connection of the user device at the time at which the network issue occurred. Additionally, in such cases, the home network provider typically does not have access to systems of the roaming network provider in order to receive the networking data needed to identify and resolve the network issue.

The embodiments disclosed herein improve technology that identifies network issues in a telecommunications network by providing a technical solution that collects data indicating network connection metrics from user devices and identifies network issues based on the collected data. The embodiments disclosed herein may cause the identified network issue to be remedied based on the collected data. The embodiments disclosed herein may cause the collected data to be transmitted contemporaneously with the collection of the data.

Unless the context requires otherwise, throughout the specification and claims which follow, the word "comprise" and variations thereof, such as, "comprises" and "comprising" are to be construed in an open, inclusive sense, for example "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. The term "or" is generally employed to include "and/or" unless the content clearly dictates otherwise. The term "and/or" is generally employed to include an inclusive or.

The headings and Abstract of the Disclosure provided herein are for convenience only and do not interpret the scope or meaning of the embodiments.

FIG. 1 is a display diagram depicting a sample environment 100 in which a handset network identification system operates, according to various embodiments described herein. The environment 100 includes one or more cell site stations 101, one or more user devices 103*a*-103*n*, an operations support system ("OSS") 105, a database server 107, a SON application server 109, a SON portal 111, and a handset network issue detection system 200 (the "system 200"). In some embodiments, the environment 100 includes a default gateway in addition to, or instead of, the OSS 105. In some embodiments, the environment 100 includes a RIC in addition to, or instead of, the SON application server 109. The cell site stations 101 may include a gNodeB, other cell sites, or some combination thereof.

The SON portal 111 is an interface that interacts with a SON 109, an OSS 105, a RIC, a Default Gateway, or some combination thereof. The SON portal 111 may determine, configure, control, or otherwise manage one or more cell site stations, such as the cell site stations 101, a G-Node B, radio parameters, or other aspects of the network. The SON portal 111 may update, configure, control, or otherwise manage the cell site stations based on one or more network connection metrics, data related to aspects or functions of the system 200, or some combination thereof. In some embodiments, the SON portal 111 manages the cell site stations dynamically as network connection metrics, data related to aspects or functions of the system 200, or some combination thereof are received by one or more of the devices, components, etc., described in connection with FIG. 1. In some embodiments, the SON portal 111 interacts with the database server 107 to obtain, collect, store, or otherwise manage data related to the status of the user device, monitored network connection metrics, network issues, cell sites, or some combination thereof.

The user devices 103*a*-103*n* (collectively "user devices 103" or individually as "user device 103") may be one or more endpoint devices, such as PCs, tablets, laptop computers, smartphones, personal assistants, drones, Internet connection devices, vehicles, satellite antennas, other antennas, fleet tracking devices, USB dongles, Mi-Fi devices, customer premises equipment ("CPE"), wireless LAN, Wi-Fi, Worldwide Interoperability for Microwave Access (WiMax) devices, or the like, and may be communicatively coupled to the network or to each other so that the plurality of endpoint devices are communicatively coupled together. The user devices 103 may be communicatively coupled to the network via interaction with an access point, such as one or more of the cell towers 101. The user devices 103 may transmit, receive, or some combination thereof, a request to hand off their session with the network to another access point.

The data base server 107 may be used by the handset network issue detection system 200 to store data indicating: network connection metrics, network issues, cell sites, user device attributes, other data used or generated by the system 200. In some embodiments, the database server 107 is a computing device that includes one or more databases for storing data. In some embodiments, the database server 107 is accessible to one or more cell sites 101. In some embodiments, the database server is positioned on the network such that it is "close" to one or more cell sites 101. In some embodiments, the database server 107 supports the exchange of SON data, data associated with the system 200, other data associated with the network, or some combination thereof, between one or more of the devices, components, systems, etc., described in connection with FIG. 1. In some embodiments, the database server 107, a default gateway, OSS 105, or other devices, components, systems, etc., associated with the network supports the exchange of the data collected, received, accessed, or otherwise used by the system 200.

The network within which the one or more cell site stations 101, one or more user devices 103, OSS 105, a database server 107, SON application server 109, SON portal 111, system 200 operate may be a network, communication system, or networked system (not shown), to which the one or more cell site stations 101, one or more user devices 103*a*-103*n*, OSS 105, a database server 107, SON application server 109, SON portal 111, system 200, may be coupled. Non-limiting examples of such a network or communication system include, but are not limited to, an Ethernet system, twisted pair Ethernet system, an intranet, a local area network (LAN) system, short range wireless network (e.g., Bluetooth®), a personal area network (e.g., a Zigbee network based on the IEEE 802.15.4 specification), a Consumer Electronics Control (CEC) communication system, Wi-Fi, satellite communication systems and networks, cellular networks, cable networks, or the like. In some embodiments, the user devices 103 are coupled to one or more roaming networks.

Figure 2:
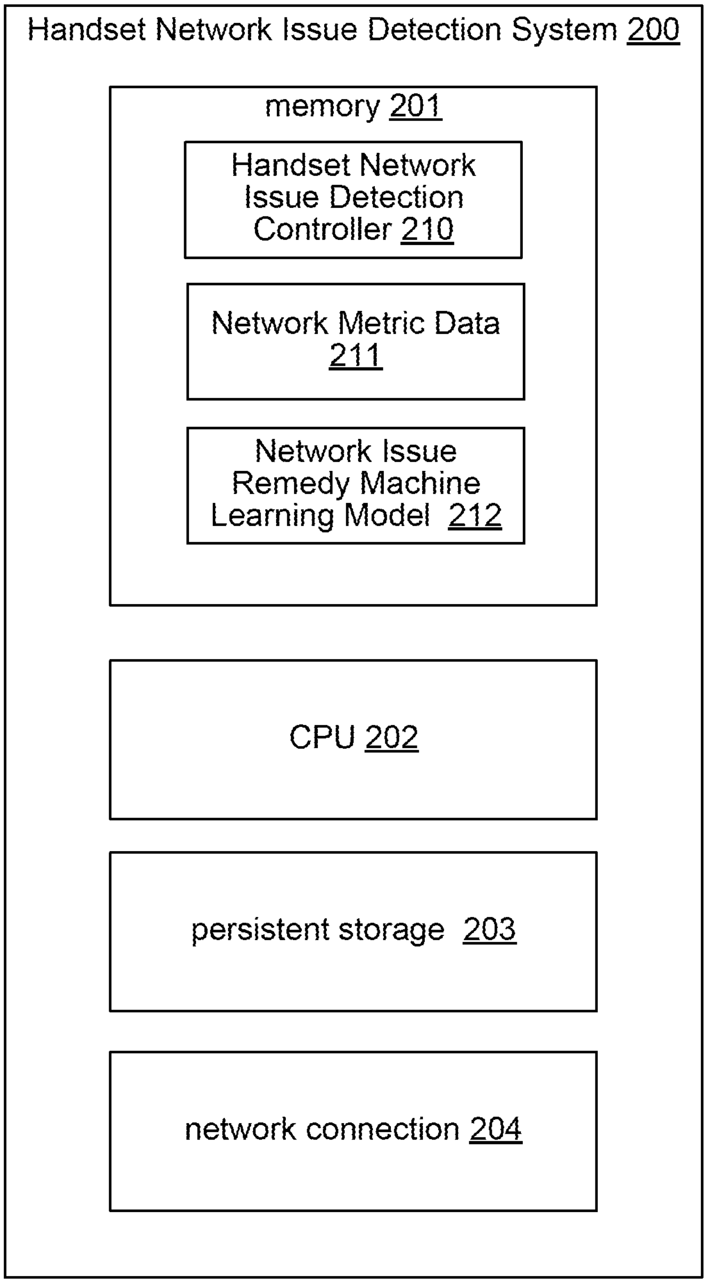
FIG. 2 is a block diagram depicting example components incorporated in a handset network issue detection system, according to various embodiments described herein.

FIG. 2 is a block diagram depicting example components incorporated in a handset network issue detection system 200, according to various embodiments described herein. One or more aspects of the handset network issue detection system 200 (the "system 200") may be implemented or integrated on or in: at least one user device, such as the user device 103; at least one data base server, such as the database server 107; a SON application server, such as the SON application server 109; a RIC (not shown); one or more other components or aspects of a network; or some combination thereof. For example, a user device may collect network connection metric data and transmit that data to a system, such as a SON application server, that determines whether a network issue has occurred and causes the network issue to be remedied.

In various embodiments, the system 200 includes one or more of the following: a computer memory 201, a processor 202, a persistent storage device 203, and a network connection 204. The memory 201 may be used for storing programs and data while they are being used, including data associated with the various data requirements of user devices or cell sites, coverage requirements of user devices or cell sites, cell sites, user devices, one or more roaming networks, an operating system including a kernel (not shown), device drivers (not shown), and one or more machine learning models. The processor 202 may be used for executing computer programs (not shown), such as computer programs which perform some or all of the functions of the system. In some embodiments, the processor 202 may be one or more processors, microcontrollers, or other computer components. In some embodiments, any of the processors, microcontrollers, or other computer components, either alone or in combination, can perform any of the functions or acts described herein. The persistent storage device 203 may be a hard drive or flash drive for persistently storing programs and data. The network connection 204 may be used for connecting to one or more cell towers or other computer systems (not shown), to send or receive data, such as via the Internet or another network and associated networking hardware, such as switches, routers, repeaters, electrical cables and optical fibers, light emitters and receivers, radio transmitters and receivers, and the like, and to scan for and retrieve signals associated with user devices, cell sites, devices or components associated with the network, devices or components associated with a roaming network, and for connecting to one or more computer devices such as devices associated with cell sites, user devices, a database server, a SON application server, a RIC, a SON portal, an OSS, a default gateway, other devices or components associated with the network, devices or components associated with a roaming network, or other computer systems. In various embodiments, the system 200 additionally includes input and output devices, such as a keyboard, a mouse, display devices, etc.

While a system 200 configured as described may be used in some embodiments, in various other embodiments, the system 200 may be implemented using devices of various types and configurations and having various components. The memory 201 may include a handset network issue detection controller 210, which contains computer-executable instructions that, when executed by the CPU 202, cause the system 200 to perform the operations and functions described herein. For example, the programs referenced above, which may be stored in computer memory 201, may include or be comprised of such computer-executable instructions. The memory 201 may also include network metric data 211, which includes data related to operations performed by the system, and a network issue remedy machine learning model 212 that generates a prediction of whether a user device is likely to experience a network issue.

The handset network issue detection controller 210 (the "controller 210") performs the core functions of the system 200, as discussed herein and also with respect to FIGS. 3-6. In particular, the controller 210 collects data indicating network connection metrics, identifies network issues, one or more times at which the network issues occurred, and cell sites associated with network issues, and causes network issues to be remedied. Additionally, the controller 210 may train, use, or some combination thereof, one or more machine learning models configured to generate a prediction of whether a network issue is likely to occur regarding a network connection of a user device. The controller 210 may also perform other functions related to the functions of the system 200 described herein.

The network metric data 211 includes data indicating one or more network connection metrics describing a network connection of one or more user devices. The network metric data 211 may include: an indication of one or more quality of service thresholds for one or more user devices; an indication of a time at which one or more user devices have been connected to a roaming network; an indication of a time at which one or more user devices have been connected to a home network; an indication of a location of a user device; an indication of data packet loss experienced by a user device; an indication of dropped calls experienced by a user device; an indication of a signal strength of a signal received by a user device; an indication of one or more attributes of one or more user devices; an indication of data related to one or more cell sites; an indication of one or more remedies for one or more network issues; other data related to identifying a network issue, causing a network issue to be resolved, etc.; or some combination thereof.

The network issue remedy machine learning model 212 (the "model 212") is an artificial intelligence or machine learning model that is trained to predict at least whether a network issue regarding a network connection of a user device is likely to occur. In some embodiments, the model 212 is trained to predict at least a type of network issue that is likely to occur. For example, in such embodiments, the machine learning model may be trained to generate an indication of a chance that the network issue will occur, such as by generating a percentage representing the likelihood that the network issue will occur (e.g. fifty percent chance a call will be dropped, twenty percent chance the user will not receive a threshold quality of service, etc.), and may determine that a network issue is likely to occur if the generated percentage is within a threshold range of percentages. In some embodiments, the model 212 is trained to predict at least a remedy for a network issue. The model 212 may be trained with historical training data, such as data included in the network metric data 211. The model 212 may be trained to consume various inputs, such as: an attribute of a user device, one or more network connection metrics, one or more network issues, data regarding one or more cell sites, one or more times at which a network issue occurred, one or more expected locations of a user device, other data related to identifying, remedying, or predicting network issues, or some combination thereof. The model 212 may output: a prediction of a type of network issue likely to be experienced by a user device, a prediction of a type of remedy for a network issue, an indication that a network issue is likely to occur, or some combination thereof. In some embodiments, the system 200 includes multiple models 212. For example, the system 200 may include a model 212 for one or more selected networks, one or more user devices, one or more network issues, one or more cell sites, or some combination thereof. In some embodiments, the machine learning model 212 is included in, stored on, or otherwise accessible to, a user device, such as the user device 103.

In an example embodiment, the controller 210 or computer-executable instructions stored on memory 201 of the system 200 are implemented using standard programming techniques. For example, the controller 210 or computer-executable instructions stored on memory 201 of the system 200 may be implemented as a "native" executable running on CPU 202, along with one or more static or dynamic libraries. In other embodiments, the controller 210 or computer-executable instructions stored on memory 201 of the system 200 may be implemented as instructions processed by a virtual machine that executes as some other program.

The embodiments described above may also use synchronous or asynchronous client-server computing techniques. However, the various components may be implemented using more monolithic programming techniques as well, for example, as an executable running on a single processor computer system, or alternatively decomposed using a variety of structuring techniques known in the art, including but not limited to, multiprogramming, multithreading, client-server, or peer-to-peer, running on one or more computer systems each having one or more processors. Some embodiments may execute concurrently and asynchronously, and communicate using message passing techniques. Equivalent synchronous embodiments are also supported. Also, other functions could be implemented or performed by each component/module, and in different orders, and by different components/modules, yet still achieve the functions of the controller 200.

In addition, programming interfaces to the data stored as part of the device handoff controller 210 can be available by standard mechanisms such as through C, C++, C#, Java, and web APIs; libraries for accessing files, databases, or other data repositories; through scripting languages such as JavaScript and VBScript; or through Web servers, FTP servers, or other types of servers providing access to stored data. The controller 210 may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of the system 200.

Furthermore, in some embodiments, some or all of the components/portions of the controller 210, or functionality provided by the computer-executable instructions stored on memory 201 of the system 200 may be implemented or provided in other manners, such as at least partially in firmware or hardware, including, but not limited to, one or more application-specific integrated circuits (ASICs), standard integrated circuits, controllers (e.g., by executing appropriate instructions, and including microcontrollers or embedded controllers), field-programmable gate arrays (FPGAs), complex programmable logic devices (CPLDs), and the like. Some or all of the system components or data structures may also be stored as contents (e.g., as executable or other machine-readable software instructions or structured data) on a computer-readable medium (e.g., as a hard disk; a memory; a computer network or cellular wireless network; or a portable media article to be read by an appropriate drive or via an appropriate connection, such as a DVD or flash memory device) so as to enable or configure the computer-readable medium or one or more associated computing systems or devices to execute or otherwise use or provide the contents to perform at least some of the described techniques. Such computer program products may also take other forms in other embodiments. Accordingly, embodiments of this disclosure may be practiced with other computer system configurations.

In general, a range of programming languages may be employed for implementing any of the functionality of the user devices; cell sites; system 200; systems, applications, and functions, of the network; systems, functions, and applications of a roaming network; etc., present in the example embodiments, including representative implementations of various programming language paradigms and platforms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, PHP, Python, JavaScript, VBScript, and the like) and declarative (e.g., SQL, Prolog, and the like).

In some embodiments, aspects of the system 200 may be implemented in an application executed by the user device. In some such embodiments, some of the functions of the system 200, such as monitoring network connection metrics, determining whether monitored data is to be transmitted by the user device, or other functions of the system 200, may be performed by the user device via execution of the application. In some embodiments, the system 200 may cause a user device to include aspects of the system 200, perform functions of the system 200, etc., by causing the user device to download an application that is executed by the user device, such as by transmitting an indication of the application, instructions to install the application, etc. In such embodiments, the system 200 may cause the user device to download the application in response to detecting that the user device has connected to the network. In some embodiments, the application is pre-installed on a user device provided to the user by the network provider or another source a user may use to obtain the user device.

In some embodiments where an application executed by the user device to perform one or more functions of the system 200, the application may be associated with a network provider of the network to which the user device is connected, a network provider that is contracted to provide networking services to the user device, an entity other than a network provider, or some combination thereof. In some such embodiments, the application may be configured by an OSS, SON Portal, other network components, or some combination thereof. In some embodiments, configuration of the application may include: a duration for which collected data is stored; an indication of one or more network connection metrics to monitor; an indication of a server or other computing device intended to transport, store, or otherwise manage the data; an indication of one or more device statuses during which the device is to transmit network connection metrics; other configuration settings for the application related to the functionality of the system 200; or some combination thereof.

In some embodiments, aspects of the system 200 are installed or otherwise made accessible by the user device by using one or more protocols or procedures of the network, such as, for example, 3GPP protocols and procedures.

The operation of certain aspects will now be described with respect to FIGS. 3-6. In at least one of various embodiments, at least a portion of the processes 300, 400, 500, and 600 described in conjunction with FIGS. 3-6, respectively, may be implemented by one or more processors or executed via circuitry on one or more computing devices, such as the system 200 described in connection with FIG. 2, the user devices 103 described in connection with FIG. 1, the cell sites 101 described in connection with FIG. 1, the SON application server 107 described in connection with FIG. 1, the database server 107 described above in connection with FIG. 1, a RIC, other computing devices, or some combination thereof.

Figure 3:
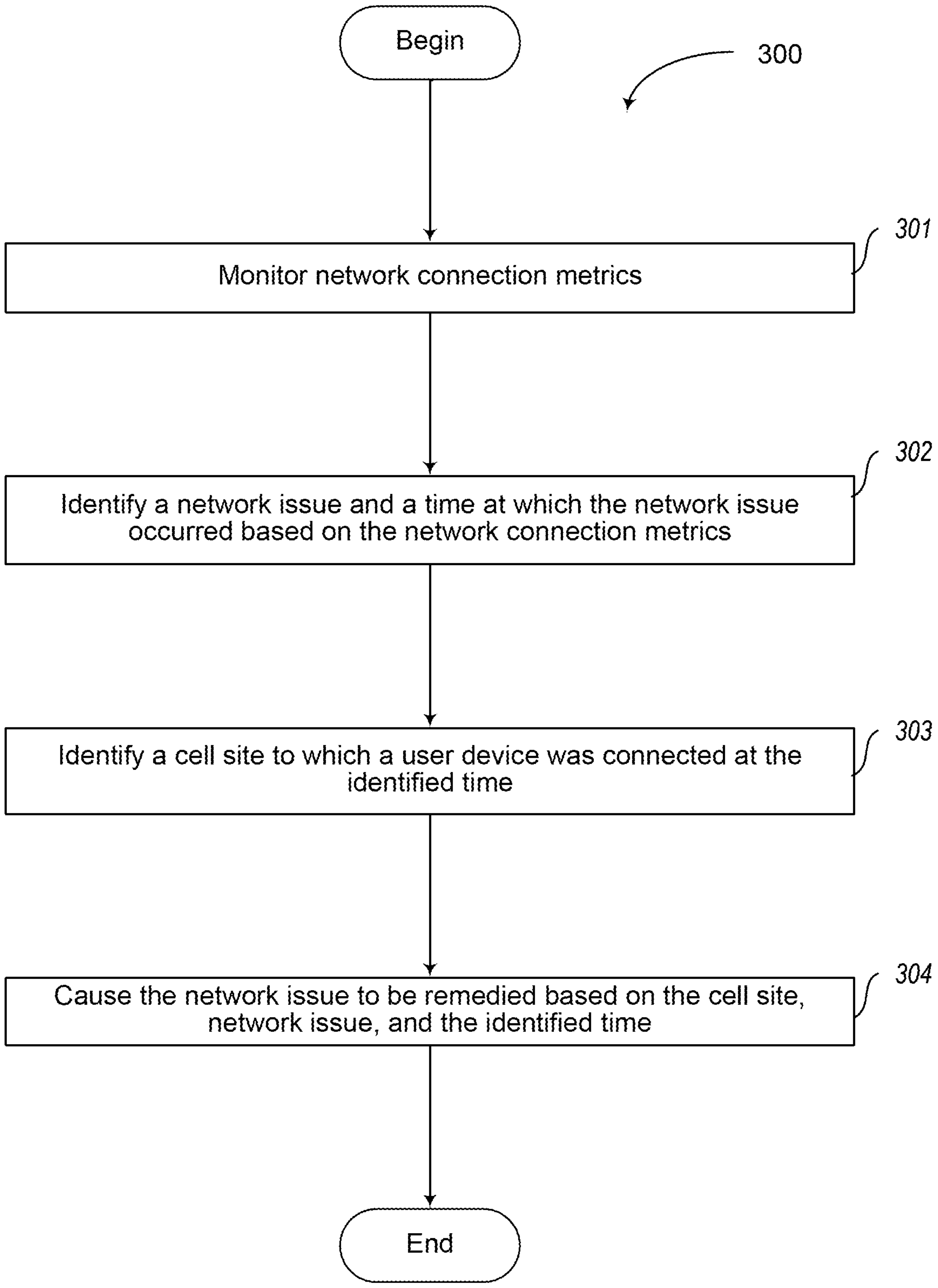
FIG. 3 is a flow diagram of a process to identify network issues, according to various embodiments described herein.

FIG. 3 is a flow diagram of a process 300 to identify network issues, according to various embodiments described herein. The process 300 may be performed by a handset network issue detection system (the "system"), such as the system 200 described above with respect to FIGS. 1 and 2. In some embodiments, as part of performing the acts included in the process 300, the system performs one or more of the acts included in the processes 400, 500, and 600 described below in connection with FIGS. 4-6.

The process 300 begins, after a start block, at act 301, where the system monitors one or more network connection metrics related to a network connection of a user device. In some embodiments, the user device collects, monitors, obtains, or otherwise receives the one or more network connection metrics. In some such embodiments, as part of performing act 301, the user device contemporaneously transmits the network connection metrics at least to the system; one or more network applications, functions, or systems, such as a SON application server, a RIC, a database server, a cell site, or other network applications, functions, or systems; or some combination thereof. In some embodiments, the monitored network connection metrics include an indication of whether the user device is connected to a roaming network, an amount of time a user device is connected to a roaming network, or other data related to a roaming network. In some embodiments, the monitored network connection metrics include an indication of one or more attributes of the user device. In some embodiments, monitoring network connection metrics includes key performance indicator ("KPI") monitoring.

In some embodiments, the system may transmit one or more selected network connection metrics. The system may select the network connection metrics for transmission based on one or more 5G Quality of Service Indicators ("5QI"), one or more quality of service class identifiers ("QCI"), other indicators of a quality of service intended to be provided to the user device, or some combination thereof. In some embodiments, data indicating one or more quality of service indicators may be configured, specified, included, or otherwise located in an operator core network, operator core system, etc., associated with the network. For example, the quality of service indicators may include a bit rate limit, and data regarding network connection metrics transmitted between the user device and the system, the user device and the network, the system and the network, or some combination thereof, can be measured. In such an example, the data regarding network connection metrics may be discounted from billing the user for receiving networking services from the network, such as by excluding the data from billing calculations, reducing the rate applied to the data, other methods of discounting data from billing, or some combination thereof.

The process 300 proceeds to act 302, where the system identifies a network issue and a time at which the network issue occurred based on the network connection metrics. In some embodiments, the identified network issue is a network issue associated with: a dropped call, a dropped data packet, an indication that a network connection metric exceeds a threshold range, an indication of a network connection metric measured when a user device is connected to a roaming network, or some combination thereof. In some embodiments, at act 302, the system detects a cause of the network issue based on one or more network connection metrics. In some embodiments, a cause of the network issue may be associated with: a cell site, a state of a user device, a location of a user device, one or more network connection metrics associated with a user device, interference caused by a roaming network, interference caused by another network or data signal, or some combination thereof. In some embodiments, the system identifies the network issue based on at least one or more attributes of other user devices, such as by using the process 500 described below in connection with FIG. 6. In some embodiments, the system identifies the network issue based on at least historical data regarding other network issues. In such embodiments, the system may identify the network issue based on historical data regarding network issues that have occurred in a geographic area in which the user device was located during the time at which the network issue occurred.

The process 300 proceeds to act 303, where the system identifies a cell site to which a user device was connected at the identified time.

The process 300 proceeds to act 304, where the system causes the network issue to be remedied based on the cell site, the network issue, and the identified time. In some embodiments, causing the network issue to be remedied includes transmitting an indication of the cell site, the network issue, the identified time, one or more network connection metrics, or some combination thereof, to a system configured to remedy network issues. In some embodiments, causing the network issue to be remedied includes generating a remedy for the network issue via a machine learning model, such as the model 212 described above in connection with FIG. 2. In some embodiments, causing the network issue to be remedied includes transmitting data to a system associated with a roaming network to which the user device was connected when the network issue occurred.

In some embodiments, causing a network issue to be remedied includes identifying one or more geographic locations in which one or more new cell sites are to be installed. For example, the system may identify one or more locations in which roaming networks are more likely to be used by user devices than the home network, and may determine that at least one of those locations is a location in which a new cell site is to be installed. In another example, the system may determine that a threshold number of devices are using a roaming network in a geographic area, and may determine that the geographic area is an area in which a cell site is to be installed. In yet another example, the system may determine that a threshold number of user devices are not receiving a threshold quality of service based on the network connection metrics within a selected geographic area, and may determine that one or more cell sites are to be installed in the selected geographic area.

In some embodiments, causing the network issue to be remedied includes changing one or more configuration settings of one or more systems, functions, or other aspects of a network. In some embodiments, changing a configuration setting includes restarting a node, cell site, or other device, system, function, etc., associated with a network, user device, or some combination thereof. In some embodiments, changing a configuration setting includes transmitting an indication of the network issue to an entity associated with a device, system, function, etc., associated with a network, user device, or some combination thereof, such as by triggering an alarm, causing a notification to be displayed to an entity, or other methods of causing information to be communicated to a user.

Figure 4:
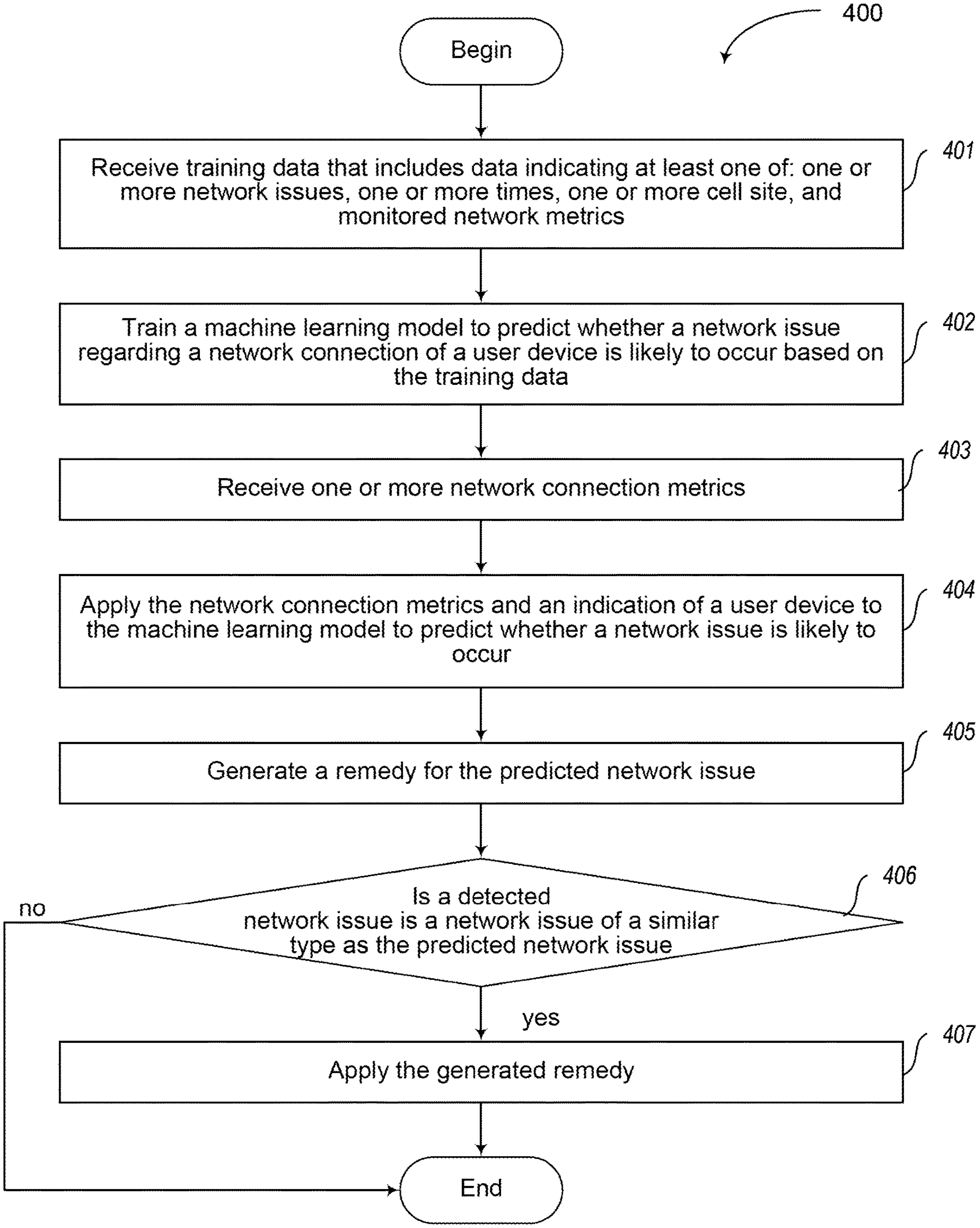
FIG. 4 is a flow diagram of a process to use a machine learning model to generate a remedy for a predicted network issue, according to various embodiments described herein.

FIG. 4 is a flow diagram of a process 400 to use a machine learning model to generate a remedy for a predicted network issue, according to various embodiments described herein. The process 400 may be performed by a handset network issue detection system (the "system"), such as the system 200 described above with respect to FIGS. 1 and 2.

The process 400 begins, after a start block, at act 401, where the system receives training data that includes data indicating at least one of: one or more network issues, one or more times, one or more cell sites, and monitored network metrics. In some embodiments, the training data is obtained from the network metric data 211, described above in connection with FIG. 2. In such embodiments, the training data may include any of the data included in the network metric data 211.

The process 400 proceeds to act 402, where the system trains a machine learning model to predict whether a network issue regarding a network connection of a user device is likely to occur based on the training data. In some embodiments, the machine learning model trained in act 402 is the model 212 described above in connection with FIG. 2. In some embodiments, the machine learning model is trained to predict a type of network issue that is likely to occur, a remedy for a network issue, the likelihood that a network issue will occur, or some combination thereof. In some embodiments, the machine learning model is trained to receive, as inputs, any of the inputs that may be received, consumed, etc., by the model 212 described above in connection with FIG. 2.

The process 400 proceeds to act 403, where the system receives one or more network connection metrics. In some embodiments, the system performs act 403 in a similar manner to act 301 described above in connection with FIG. 3.

The process 400 proceeds to act 404, where the system applies the network connection metrics and an indication of a user device to the machine learning model to predict whether a network issue is likely to occur.

The process 400 proceeds to act 405, where the system generates a remedy for the predicted network issue. In some embodiments, the system generates the remedy based on one or more network connection metrics. In some embodiments, the system generates the remedy by applying the predicted network issue, one or more network connection metrics, one or more cell sites, one or more attributes of the user device, or some combination thereof, to a machine learning model, such as the model 212 described above in connection with FIG. 2.

The process 400 proceeds to act 406, where the system determines whether a detected network issue is a network issue of a similar type as the predicted network issue. In some embodiments, the detected network issue is detected in a similar manner to act 302, described above in connection with FIG. 3.

If the detected network issue is a network issue of the same type as the predicted network issue, the process 400 proceeds to act 406, where the system applies the generated remedy. Otherwise, the process ends. In some embodiments, if the detected network issue is not a network issue of the same type as the predicted network issue, the system generates a different remedy for the detected network issue in a similar manner to act 405.

In some embodiments, the system applies the generated remedy to a network system, a user device, a roaming network system, or some combination thereof. In some embodiments, the system causes a network system, user device, roaming network system, or some combination thereof. In such embodiments, the system may transmit instructions to apply the remedy to the network system, user device, roaming network, or some combination thereof.

After act 407, the process 400 ends. In some embodiments, the system performs one or more aspects of the process 400 without performing other aspects of the process 400. For example, the system may perform acts 403-407 without first training the machine learning model in some circumstances, such as when the machine learning model has already been trained.

In some embodiments, the system retrains the machine learning model based on network metric data, such as the network metric data 211 described above in connection with FIG. 2. For example, the system may retrain the machine learning model based on a determination that a threshold amount of new network metric data has been obtained by the system. In another example, the system may retrain the machine learning model after a threshold amount of time has passed.

Figure 5:
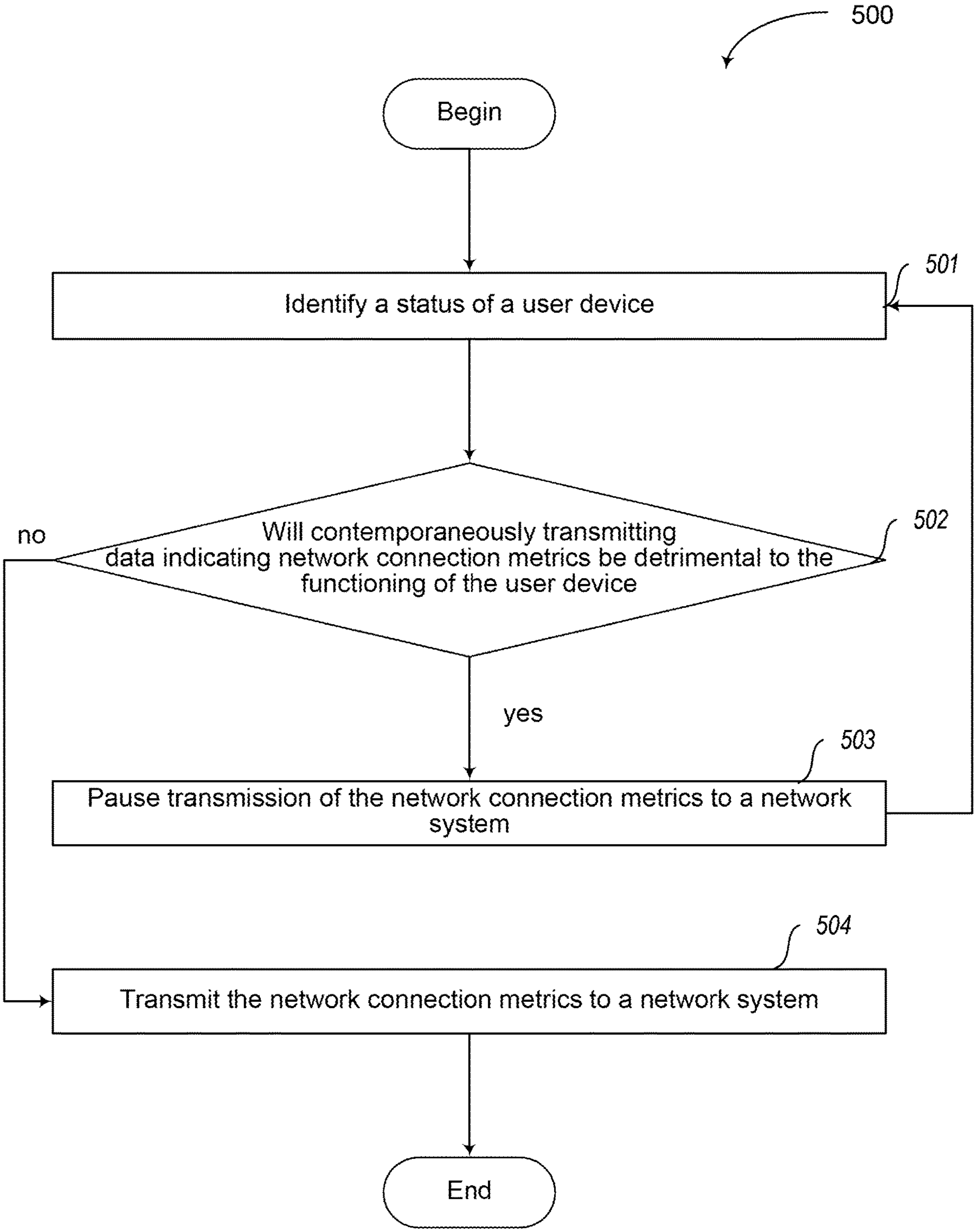
FIG. 5 is a flow diagram of a process to determine whether transmission of data indicating network connection metrics is to be paused, according to various embodiments described herein.

FIG. 5 is a flow diagram of a process 500 to determine whether transmission of data indicating network connection metrics is to be paused, according to various embodiments described herein. The process 500 may be performed by a handset network issue detection system (the "system"), such as the system 200 described above with respect to FIGS. 1 and 2.

The process 500 begins, after a start block, at act 501, where the system identifies a status of a user device. In some embodiments, a status of a user device may include: a battery or power level of a user device, an indication that a user device is charging, one or more bandwidth limits of a user device, one or more data transmission thresholds associated with a user device, one or more attributes of a user device, one or more networks to which a user device is connected, a location of a user device, other aspects of a user device that indicate it's status, or some combination thereof. In some embodiments, at act 501, the system identifies a network load of a network to which a user device is connected. In such embodiments, the system may perform the process 500 based on at least the network load. In some embodiments, the system uses one or more artificial intelligence or machine learning model tools to determine a status of the user device.

The process 500 proceeds to act 502, where the system determines whether contemporaneously transmitting data indicating one or more network connection metrics will be detrimental to the functioning of the user device. For example, the system may determine whether the battery or power level of the user device is below a threshold level, such that transmitting the data indicating network connection metrics will exceed a threshold amount of battery or power level drain on the user device. In another example, the system may determine that signal transmission functions of the user device may be negatively affected based on one or more bandwidth limits, connection thresholds, etc. In such an example, a detrimental effect to the user device may be that the user device will exceed a connection threshold, that a threshold amount of bandwidth must be used to transmit the network connection metrics, or other detrimental effects related to bandwidth limits, connection thresholds, etc.

If the contemporaneous transmission of the network connection metrics will be detrimental to the functioning of the user device, the process 500 proceeds to act 503, otherwise the process 500 proceeds to act 504.

At act 503, the system pauses transmission of the network connection metrics to a network system. In some embodiments, after act 503, the system determines whether the status of the user device has changed such that transmission of the network connection metrics is no longer detrimental to the user device. In such embodiments, the system may resume transmission of the network connection metrics based on a determination that transmission of the network connection metrics is no longer detrimental to the functioning of the user device. In some embodiments, the system may continue collecting network connection metrics when the transmission of the network connection metrics is paused. In such embodiments, the system may cause the network connection metrics collected while the transmission was paused to be transmitted to the network system when the transmission resumes.

For example, if the detrimental effect of transmitting the network connection metrics is related to a power level or battery level of the user device, the system may cause the transmission to resume in response to a determination that the power level or battery level has exceeded a threshold limit, the user device is charging, etc. In another example, if the detrimental effect is related to a connection threshold or bandwidth limit, the system may cause the transmission to resume in response to a determination that the connection threshold or bandwidth limit is no longer at risk of being exceeded, when the user device is connected to a Wi-Fi network, etc.

After act 503, the process 500 returns to act 501. In some embodiments, after act 503, the process 500 ends.

At act 504, the system causes the user device to contemporaneously transmit the network connection metrics to a network system.

After act 504, the process 500 ends. In some embodiments, the system performs one or more aspects of the process 500 in response to a determination that a status of the user device has changed. In some embodiments, the system performs one or more aspects of the process 500 after a threshold amount of time has passed.

Figure 6:
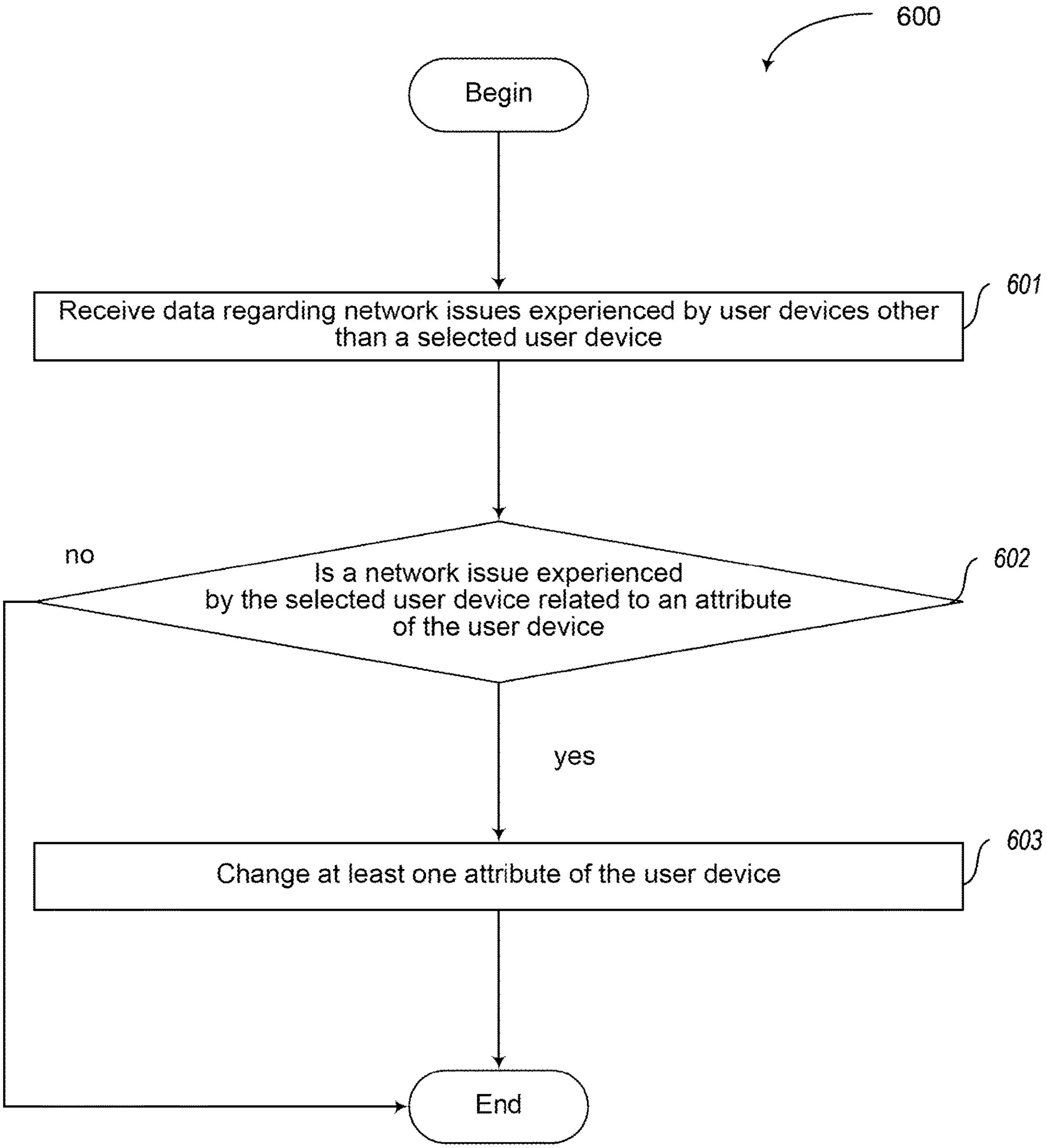
FIG. 6 is a flow diagram of a process to remedy a network issue by changing an attribute of a user device, according to various embodiments described herein.

FIG. 6 is a flow diagram of a process 600 to remedy a network issue by changing an attribute of a user device, according to various embodiments described herein. The process 600 may be performed by a handset network issue detection system (the "system"), such as the system 200 described above with respect to FIGS. 1 and 2. An attribute of a user device is a property, condition, or other aspect of a user device. Examples of attributes of a user device include, but are not limited to: a type of the user device (e.g. an iPhone, and Android phone, a tablet, a laptop, a car, etc.); a status of the user device (e.g. a battery or power level, the activation status of a mode for receiving transmitted data signals, such as Wi-Fi, Bluetooth, NFC, etc., whether the user device is conducting a phone call, etc.); a type, make, model, specification, or other attribute of hardware included in, or accessible by, the user device (e.g. an antenna included in the user device, a processor included in the user device, etc.); a network quality threshold, network resource limit, etc., for the user device; or other attributes of a user device.

The process 600 begins, after a start block, at act 601, where the system receives data regarding network issues experienced by user devices other than a selected user device. In some embodiments, the data regarding network issues includes an indication of one or more attributes of the user devices. The data regarding network issues may be included in the network metric data 211 described above in connection with FIG. 2. In some embodiments, the system may use the data obtained in act 601 to identify a network issue, a cause of a network issue, etc., experienced by the selected user device. In some embodiments, the data indicating one or more network issues includes data indicating a cell site, a time, one or more network metrics, other data used to identify or remedy a network issue affecting the network connection of a user device, or some combination thereof.

The process 600 proceeds to act 602, where the system determines whether a network issue experienced by the selected user device is related to an attribute of the user device based on the data regarding network issues experienced by other user devices. For example, the system may identify one or more network issues based on a determination that the network issues are network issues of the same type as a network issue experienced by the selected user device. In such an example, the system may determine whether attributes of the user devices experiencing the network issues of the same type are similar to attributes of the selected user device. The system may use the determination to determine whether one or more attributes of the selected user device are related to the detected network issue. In another example, the system may determine whether the network issue is related to an attribute of the selected user device based on one or more remedies of the network issues experienced by other user devices, such as when the remedy includes changing an attribute of a user device.

If the detected network issue is related to an attribute of the user device, the process 600 proceeds to act 603, where the system changes at least one attribute of the user device. In some embodiments, the system determines which attribute is to be changed based on the data regarding network issues experienced by other user devices. After act 603, the process 600 ends.

If the detected network issue is not related to an attribute of the user device, the process 600 ends. In some embodiments, even if the detect network issue is not related to an attribute of the user device, the system may use the data regarding network issues experienced by other user devices to identify a network issue affecting the selected user device, generate a remedy for a network issue affecting the selected user device, performing other functions regarding a network issue affecting the selected user device, or some combination thereof.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system for monitoring network issues via a user device, the system comprising:

at least one processor; and at least one memory coupled to the at least one processor, the memory having computer-executable instructions stored thereon that, when executed by the at least one processor, cause the system to:

monitor, by the user device, a set of network connection metrics for a network connection of the user device;

generate a remedy for a predicted network issue regarding the network connection of the user device;

identify a time at which an identified network issue occurred, the network issue being associated with a network to which the user device was connected at the time the network issue occurred, based on the monitored network connection metrics;

identify a cell site to which the user device was connected during the time at which the identified network issue occurred; and cause the identified network issue to be remedied based on the cell site, the identified network issue, and the time at which the identified network issue occurred, by causing the system to:

determine whether the predicted network issue is a network issue of a same type as the identified network issue; and in response to determining that the predicted network issue is a network issue of the same type as the identified network issue, cause the generated remedy to be applied.

2. The system of claim 1, wherein to cause the identified network issue to be remedied, the system is further caused to:

transmit data indicating the cell site, the identified network issue, and the time at which the identified network issue occurred, to a system configured to remedy network issues.

3. The system of claim 1, wherein the system is further caused to:

receive training data, the training data including an indication of one or more network issues, one or more times at which the one or more network issues occurred, and one or more cell sites associated with the one or more network issues; and train a machine learning model to predict whether a network issue regarding a network connection of a user device is to occur based on the training data, wherein the machine learning model takes one or more network connection metrics as input.

4. The system of claim 1, wherein the system is further caused to:

predict whether a network issue regarding the network connection of the user device is to occur by applying at least a portion of the set of network connection metrics to a machine learning model trained to predict whether a network issue is to occur regarding the network connection of the user device; and generate, based on the predicted network issue, the remedy for the predicted network issue.

5. The system of claim 4, wherein to cause the identified network issue to be remedied, the system is further caused to:

apply the generated remedy to the user device.

6. The system of claim 1, wherein to cause the identified network issue to be remedied, the system is further caused to:

determine a cause of the identified network issue based on the data indicating the cell site, the identified network issue, and the time at which the identified network issue occurred.

7. The system of claim 6, wherein the cause of the identified network issue includes one or more of:

a cell site;

a state of the user device;

a location of the user device; and one or more network connection metrics.

8. The system of claim 1, wherein the identified network issue includes one or more of:

a dropped call;

a dropped data packet;

a network connection metric that has exceeded a threshold range; and a network connection metric associated with a network connection between the user device and a roaming network.

9. The system of claim 1, wherein the system is further caused to:

transmit, by the user device, an indication of the set of network connection metrics to a system configured to remedy network issues contemporaneously as new network connection metrics are monitored.

10. The system of claim 9, wherein to transmit the indication of the set of network connection metrics, the system is further caused to:

identify a status of the user device;

determine, based on the status of the user device, whether contemporaneously transmitting the indication of the set of network connection metrics will be detrimental to a functioning of the user device; and based on a determination that contemporaneously transmitting the indication of the set of network connection metrics will be detrimental to the functioning of the user device, pausing the transmission of the indication of the set of network connection metrics.

11. The system of claim 1, wherein to monitor the set of network connection metrics, the system is further caused to:

detect whether the user device is connected to a roaming network or a home network.

12. The system of claim 1, wherein to cause the identified network issue to be remedied, the system is further caused to:

receive data regarding one or more network issues experienced by user devices other than the user device;

determine, based on the data regarding one or more network issues experienced by user devices other than the user device, whether the identified network issue is related to one or more attributes of the user device; and based on a determination that the identified network issue is related to one or more attributes of the user device, cause at least one attribute of the user device to change.

13. A system for monitoring network issues via a user device, the system comprising:

at least one processor; and at least one memory coupled to the at least one processor, the memory having computer-executable instructions stored thereon that, when executed by the at least one processor, cause the system to:

monitor, by the user device, a set of network connection metrics for a network connection of the user device;

identify a time at which a network issue occurred and the network issue, the network issue being associated with a network to which the user device was connected at the time the network issue occurred, based on the monitored network connection metrics;

identify a cell site to which the user device was connected during the time at which the identified network issue occurred; and cause the identified network issue to be remedied based on the cell site, the identified network issue, and the time at which the identified network issue occurred by transmitting data indicating the cell site, the identified network issue, and the time at which the identified network issue occurred, to a system associated with a roaming network to which the user device has connected in the past.

14. A system for monitoring network issues based on data received from a plurality of user devices, the system comprising:

at least one processor; and at least one memory coupled to the at least one processor, the memory having computer- executable instructions stored thereon that, when executed by the at least one processor, cause the system to:

receive, from the plurality of user devices, one or more network connection metrics, each of the one or more network connection metrics describing an aspect of a network connection of a user device of the plurality of user devices, by, for at least one user device of the plurality of user devices, causing the system to:

identify a status of the at least one user device;

determine, based on the status of the at least one user device, whether contemporaneously transmitting the one or more network connection metrics will be detrimental to a functioning of the at least one user device; and transmit the one or more network connection metrics based on the determination of whether contemporaneously transmitting the one or more network connection metrics will be detrimental to the functioning of the at least one user device;

identify a time at which a network issue associated with a user device occurred, wherein the network issue is associated with a network to which the user device was connected at the time at which the network issue occurred, based on the received network connection metrics;

identify a cell site to which the user device was connected during the time at which the identified network issue occurred; and cause the identified network issue to be remedied based on the cell site, the identified network issue, and the time at which the identified network issue occurred.

15. The system of claim 14, wherein to cause the identified network issue to be remedied, the system is further caused to:

receive data regarding a set of network connection metrics of one or more user devices other than the user device and a set of attributes of the one or more user devices;

determine, based on the data regarding set of network connection metrics and the set of attributes, whether the identified network issue is related to one or more attributes of the user device.

16. The system of claim 14, wherein the system is further caused to:

generate training data based on data indicating network connection metrics, data indicating identified network issues, data indicating one or more times at which a network issue occurred, and data indicating one or more cell sites; and train a machine learning model to predict whether a network issue regarding a network connection of a user device is likely to occur based on the training data, wherein the machine learning model receives one or more network connection metrics as input.

17. The system of claim 14, wherein the system is further caused to:

predict whether a network issue is likely to occur regarding the network connection of the user device by applying at least a portion of the one or more network connection metrics to a machine learning model trained to predict whether a network issue is likely to occur regarding the network connection of a user device; and generate, based on the predicted network issue, a remedy for the predicted network issue.

18. The system of claim 14, wherein the system is further caused to:

detect whether the user device is connected to a roaming network or a home network.

19. A non-transitory processor-readable storage medium that stores at least one of instructions or data, the instructions or data, when executed by at least one processor, cause the at least one processor to perform a method comprising:

receiving, via a plurality of user devices, one or more network connection metrics;

identifying a network issue associated with a user device of the plurality of user devices and a time at which the network issue occurred based on the received network connection metrics, the network issue being further associated with a network to which the user device was connected at the time the network issue occurred;

identifying a cell site to which the user device was connected during the time at which the identified network issue occurred; and causing the identified network issue to be remedied based on the cell site, the identified network issue, and the time at which the identified network issue occurred by:

receiving data regarding a set of network connection metrics of one or more user devices of the plurality of user devices other than the user device and a set of attributes of the one or more user devices; and determining, based on the data regarding the set of network connection metrics and the set of attributes, whether the identified network issue is related to one or more attributes of the user device.

20. The non-transitory processor-readable storage medium of claim 19, wherein the at least one processor is at least one processor of one or more of:

a Self-Organizing Network ("SON");

a Radio Access Network Intelligent Controller ("RIC"); and the user device of the plurality of user devices.

* * * * *